Figure 1:
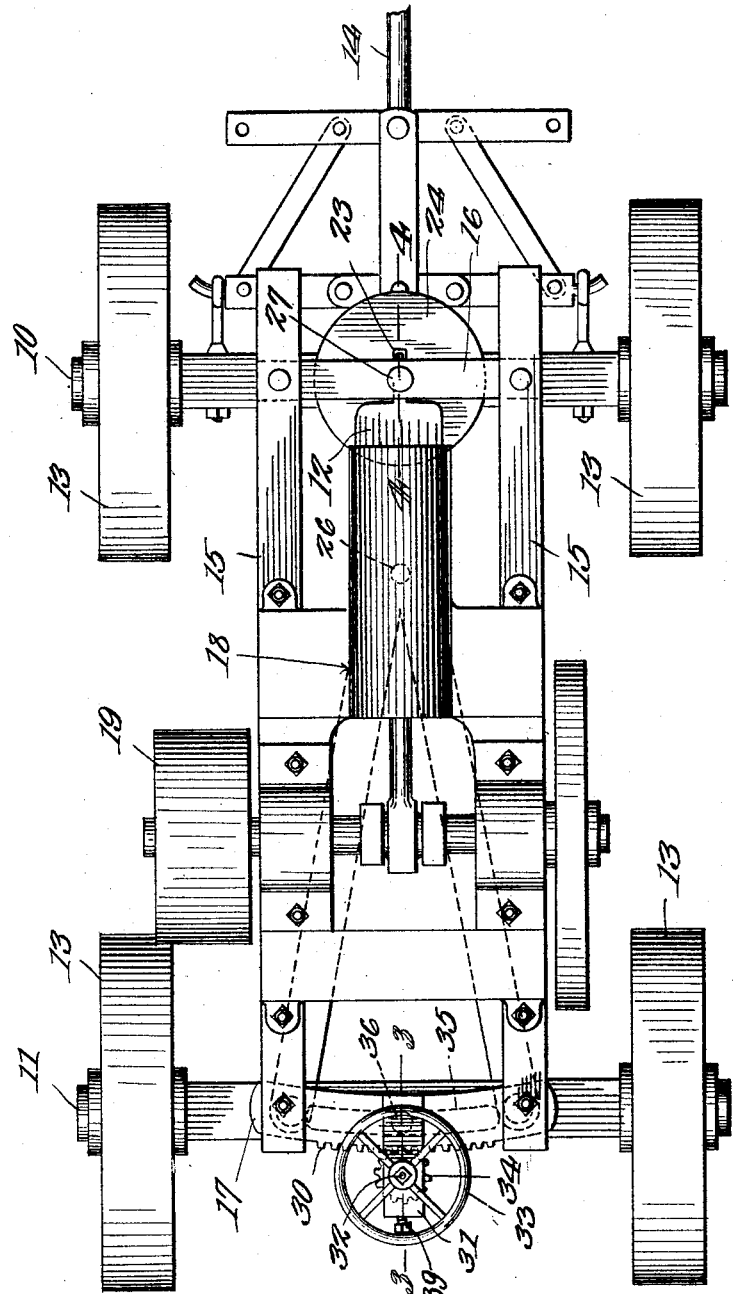

V. A. NIXON.
PORTABLE ENGINE TRUCK.
APPLICATION FILED OCT. 29, 1913.

1,115,725.

Patented Nov. 3, 1914.
2 SHEETS—SHEET 1.

Witnesses
J. B. Wooden,
Margery C. Lucas.

Inventor
Vergne A. Nixon
by Milo L. Thrumbler.
Attorneys.

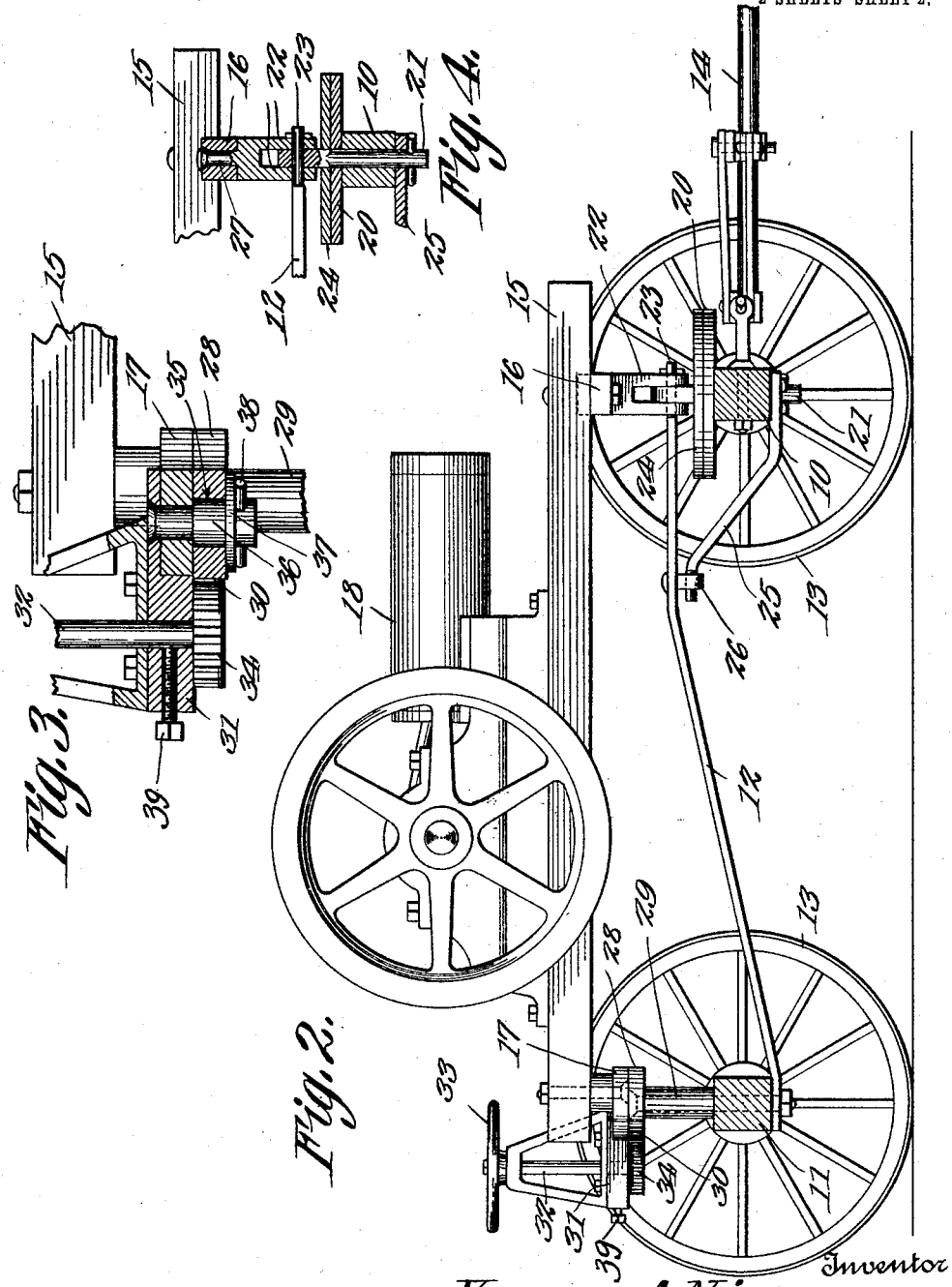

UNITED STATES PATENT OFFICE.

VERGNE A. NIXON, OF LAKE VILLA, ILLINOIS.

PORTABLE ENGINE-TRUCK.

1,115,725.  Specification of Letters Patent.  Patented Nov. 3, 1914.

Application filed October 29, 1913. Serial No. 798,044.

*To all whom it may concern:*

Be it known that I, VERGNE A. NIXON, a citizen of the United States, residing at Lake Villa, in the county of Lake and State of Illinois, have invented certain new and useful Improvements in Portable Engine-Trucks, of which the following is a specification.

This invention relates to portable trucks for supporting an engine, which enables the engine to be transported to and from the place of use.

The invention has for its object to mount on a truck of this kind an engine bed in such a manner that said bed may be adjusted laterally on the truck for the purpose of alining the belt-wheel of the engine with the drive pulley of the machinery which is to be operated, and also to provide novel and improved means for effecting the adjustment of the engine bed.

The herein stated objects are attained by means of a combination and arrangement of parts to be hereinafter described and claimed, and in order that the invention may be better understood, reference is had to the accompanying drawings, in which—

Figure 1 is a plan view of the truck; Fig. 2 is a side elevation thereof, partly broken away; Fig. 3 is a cross-section on the line 3—3 of Fig. 1, and Fig. 4 is a cross-section on the line 4—4 of Fig. 1.

Referring specifically to the drawing, the running gear of the truck comprises front and rear axles 10 and 11, respectively, connected by a reach 12 and carrying wheels 13. To the front axle is connected a tongue or pole 14 for the draft animals. The truck carries a secondary frame serving as an engine bed and comprising longitudinal side sills 15 connected in front by a cross sill 16 and at the rear by a cross sill 17. On this bed is mounted an internal combustion engine or other motor 18 on the shaft of which is a belt-wheel 19.

Through the front axle 10 and a fifth-wheel plate 20 thereon, passes a king-bolt 21. On the bottom of the front cross sill 16 are ears 22 between which the upper end of the king-bolt seats and is secured by a pivot bolt 23, whereby the front axle is given a pivotal support and allowed to tilt sidewise, thus eliminating all strain on the engine bed in passing over uneven roads, and keeping the engine bed level. The king-bolt carries a fifth-wheel plate 24 which bears on the fifth-wheel plate 20. The king-bolt projects from the bottom of the axle, and to said projecting end is connected one end of a brace 25 which extends rearward and has its rear end swiveled in a lug 26 on the bottom of the reach so that it may partake of the tilting movement of the axle hereinbefore described.

The pivot bolt 23 is a continuation of the reach 12, the front end of the latter being reduced and passed through the ears 22. The ears are on a stem 27 passing loosely through the front cross sill 16 and serving as a pivotal support for the front end of the engine bed.

The rear cross sill 17 is curved on an arc having for its center the axis of the pivot stem 27, and said sill seats slidably on a correspondingly curved plate 28 mounted on posts 29 rising from the axle 11. The plate 28 has rack teeth 30 in one of its edges. The cross sill 17 carries a horizontal bracket 31 having a bearing for a vertical shaft 32 provided with a hand wheel 33 at its upper end. On the lower end of the shaft is fast a pinion 34 which is in mesh with the rack-teeth 30. The plate 28 has a concentric slot 35 through which passes a pin 36 depending from the bottom of the cross sill 17, whereby the latter is guided. Below the plate 28 the pin 36 carries a washer 37 which is held in place by a cross pin 38.

The herein described manner of mounting the engine bed enables the same to be swung in a horizontal plane, this adjustment being effected by the pinion 34 and the rack 30 upon turning the hand wheel 33. The purpose of this adjustment of the engine bed is to line up the belt wheel 19 with the drive pulley of the separator or other machine to be operated, without moving the truck after the latter has been placed as near as possible in line. If the belt wheel gets out of line from vibration or side draft, it can be properly lined up without stopping the engine 18, and the belt can be quickly thrown off in case of an emergency by simply swinging the engine bed so that the belt wheel comes out of line with the drive pulley.

In order that the engine bed may be locked in adjusted position, the bracket 31 carries a set screw 39 which is engageable with the shaft 32.

I claim:

1. The combination with a truck having a front axle from which a king-bolt extends, of a secondary frame, a pivot stem engageable by one end of the secondary frame to permit the same to swing in a horizontal plane, said stem being pivotally connected to the king-bolt to allow the front axle to tilt sidewise, a support for the other end of the secondary frame, and means for swinging the secondary frame about its pivot.

2. The combination with a portable truck, of a secondary frame mounted thereon, a pivot on a truck engageable by one end of the secondary frame to permit the same to swing in a horizontal plane, a curved plate carried by the truck, on which plate the other end of the secondary frame is supported, said base having rack teeth in one of its edges, and extending transversely of the truck, a pinion carried by the last-mentioned end of the secondary frame and in mesh with the aforesaid rack teeth, and means for operating the pinion.

3. The combination with a truck having a front axle from which a king-bolt extends, of a secondary frame, a pivot stem engageable by one end of the secondary frame to permit the same to swing in a horizontal plane, said stem being connected to the king-bolt, a curved plate carried by the truck, on which plate the other end of the secondary frame is supported, said plate having rack teeth in one of its edges, and extending transversely of the truck, a pinion carried by the last-mentioned end of the secondary frame and in mesh with the aforesaid rack teeth, and means for operating the pinion.

In testimony whereof I affix my signature in presence of two witnesses.

VERGNE A. NIXON.

Witnesses:
H. INA TITUS,
P. M. LUND.

---

Copies of this patent may be obtained for five cents each, by addressing the "Commissioner of Patents, Washington, D. C."